(12) United States Patent
Ozawa

(10) Patent No.: US 8,773,615 B2
(45) Date of Patent: Jul. 8, 2014

(54) LIQUID CRYSTAL DEVICE AND PROJECTOR

(75) Inventor: Norihiko Ozawa, Shiojiri (JP)

(73) Assignee: Seiko Epson Corporation, Tokyo (JP)

(*) Notice: Subject to any disclaimer, the term of this patent is extended or adjusted under 35 U.S.C. 154(b) by 226 days.

(21) Appl. No.: 13/422,356

(22) Filed: Mar. 16, 2012

(65) Prior Publication Data

US 2012/0242915 A1    Sep. 27, 2012

(30) Foreign Application Priority Data

Mar. 25, 2011  (JP) .................................. 2011-067782

(51) Int. Cl.
G02F 1/1335    (2006.01)

(52) U.S. Cl.
USPC ...... 349/62; 349/64; 349/5; 349/95; 349/104; 359/626; 359/627; 257/98; 362/615

(58) Field of Classification Search
CPC .............. G02F 1/1333; G02B 19/0019; G02B 2006/12102
USPC ................................................. 349/62, 5, 95
See application file for complete search history.

(56) References Cited

U.S. PATENT DOCUMENTS

| | | | |
|---|---|---|---|
| 5,187,599 A * | 2/1993 | Nakanishi et al. | 349/95 |
| 7,087,180 B2 | 8/2006 | Kaise et al. | |
| 2006/0082692 A1* | 4/2006 | Kamijima et al. | 349/5 |
| 2006/0104084 A1* | 5/2006 | Amemiya et al. | 362/561 |
| 2007/0165147 A1* | 7/2007 | Kamijima et al. | 349/38 |
| 2007/0200975 A1* | 8/2007 | Kamijima | 349/95 |
| 2007/0258137 A1* | 11/2007 | Kamijima | 359/431 |
| 2009/0167983 A1* | 7/2009 | Lee et al. | 349/62 |
| 2010/0278480 A1* | 11/2010 | Vasylyev | 385/33 |
| 2011/0205468 A1* | 8/2011 | Hirakata et al. | 349/95 |

FOREIGN PATENT DOCUMENTS

| | | | |
|---|---|---|---|
| JP | 2552389 B | 11/1996 | |
| JP | 4207599 B | 1/2009 | |

* cited by examiner

*Primary Examiner* — Edward Glick
*Assistant Examiner* — Sang V Nguyen
(74) *Attorney, Agent, or Firm* — ALG Intellectual Property, LLC

(57) ABSTRACT

In a liquid crystal device, a liquid crystal layer is interposed between first and second substrates. The liquid crystal device includes a light-shielding layer formed in a lattice shape and a condensing lens condensing light incident on the side of the first substrate into the inside of an opening portion of a light-shielding section. In the second substrate, a prism element condensing the light which has been incident from the side of the first substrate and has passed and spread through the condensing lens, the liquid crystal layer, and the opening portion is disposed at a position overlapping the light-shielding layer in a plan view. The prism element includes a groove formed in the second substrate.

6 Claims, 13 Drawing Sheets

LIQUID CRYSTAL DEVICE AND PROJECTOR

BACKGROUND

1. Technical Field

The present invention relates to a liquid crystal device and a projector.

2. Related Art

An image display region of a liquid crystal device used as a light valve of a projector includes a pixel section through which light exits and an inter-pixel region where wirings supplying electric signals to the pixel section are formed. For example, the inter-pixel region of the liquid crystal device is covered with a light-shielding layer so that light is not transmitted through the light-shielding layer.

In the liquid crystal device, it is desirable that the amount of light exiting from the pixel section is as large as possible and the light is bright. Therefore, high light use efficiency has to be achieved. For example, in a liquid crystal device disclosed in Japanese Patent No. 2552389, micro-lenses are disposed in both a light-incident surface and a light-exit surface of a liquid crystal panel. The light incident on a portion, which does not contribute to display of the liquid crystal panel, is converged into the pixel section of the liquid crystal panel by the micro-lenses, thereby improving the actual aperture ratio of the liquid crystal panel.

In the liquid crystal device disclosed in Japanese Patent No. 2552389, the liquid crystal panel and the micro-lenses are separately formed. Therefore, it is not easy to position a pair of micro-lenses with the liquid crystal panel interposed therebetween and it takes a time to manufacture the liquid crystal device.

SUMMARY

An advantage of some aspects of the invention is that it provides a liquid crystal device that is capable of realizing high light use efficiency and is easily manufactured and a projector.

According to an aspect of the invention, there is provided a liquid crystal device in which a liquid crystal layer is interposed between a first substrate on a light incident side and a second substrate on a light exit side. The liquid crystal device includes: a light-shielding section that is formed in one of the first and second substrates and includes a light transmission region at a position overlapping a pixel in a plan view and a light-shielding region at a position overlapping a space between the pixels in a plan view; a condensing lens that is disposed in the first substrate and condenses incident light into an inside of the light transmission region of the light-shielding section; and a prism element that is disposed in the second substrate and condenses light passing and spreading through the light transmission region into a position overlapping the light-shielding region in a plan view. The prism element includes a groove formed in the second substrate.

In the liquid crystal device, the condensing lens converges the light incident on the light-shielding section into the light transmission region of the light-shielding section and the prism element condenses the light which has passed and spread through the light transmission region. Further, since the groove is formed in the second substrate and the prism element including the groove is formed, it is easy to position the prism element. Accordingly, it is possible to provide the liquid crystal device that is capable of realizing the high light use efficiency and is easily manufactured.

In the liquid crystal device, a depth of the groove may be greater than a width of the groove.

With such a configuration, it is possible to reliably condense the light which has passed and spread through the light transmission region of the light-shielding section. On the other hand, when the depth of the groove is less than the width of the groove, the light which has passed and spread through the light transmission region of the light-shielding section may not sufficiently be condensed in some cases.

In the liquid crystal device, the light-shielding section may be formed by a data line and a scanning line intersecting each other. The groove may have a V shape in a cross-sectional view. A width of a portion overlapping the data line in the groove may be identical with a width of a portion overlapping the scanning line in the groove. A depth of the portion overlapping the data line in the groove may be identical with a depth of the portion overlapping the scanning line in the groove.

With such a configuration, the angle of the front end portion of the portion overlapping the data line in the groove is identical with the angle of the front end portion of the portion overlapping the scanning line in the groove. Therefore, the cross-sectional shape of the portion overlapping the data line in the prism element is identical with the cross-sectional shape of the portion overlapping the scanning line. Accordingly, it is possible to uniformly condense the light which has passed and spread through the light transmission region of the light-shielding section.

In the liquid crystal device, a cover portion occupying a portion of the groove close to the liquid crystal layer may be formed between the light-shielding section and the prism element. An inside of the groove may be a void.

With such a configuration, the refractive index of the inside (for example, an air layer or vacuum) of the groove is less than the refractive index of the second substrate. Therefore, when the light which has passed and spread through the light transmission region of the light-shielding section is incident on the prism element, it is easy to satisfy a total reflection condition. Accordingly, it is possible to reliably condense the light which has passed and spread through the light transmission region of the light-shielding section.

In the liquid crystal device, a surface of the cover portion close to the light-shielding section may be a flat surface.

With such a configuration, there is less a concern that line disconnection occurs when wirings or the like are formed in the upper portion of the cover portion.

In the liquid crystal device, a part of the cover portion may penetrate into a portion of the groove close to the liquid crystal layer. A reflection film may be formed in a portion at least overlapping the portion of the groove into which the part of the cover portion penetrates.

With such a configuration, the light incident on the portion of the groove into which the part of the cover portion penetrates can be reflected from the reflection film formed in the portion of the groove, even when the light which has passed and spread through the light transmission region of the light-shielding section is incident on the portion of the groove into which the part of the cover portion penetrates in the prism element. Accordingly, it is possible to reliably condense the light which has passed and spread through the light transmission region of the light-shielding section.

In the liquid crystal device, a reflection film may be formed inside the groove.

With such a configuration, a light-incident surface of the prism element functions as a reflection surface. Accordingly, it is possible to reliably condense the light which has passed and spread through the light transmission region of the light-shielding section.

According to another aspect of the invention, there is provided a projector including a light source device; the above-described liquid crystal device which modulates light emitted from the light source device in accordance with image information; and a projection optical system projecting the light modulated by the liquid crystal device as a projected image.

Since the projector includes the above-described liquid crystal device, it is possible to provide the projector capable of displaying a high-quality image.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
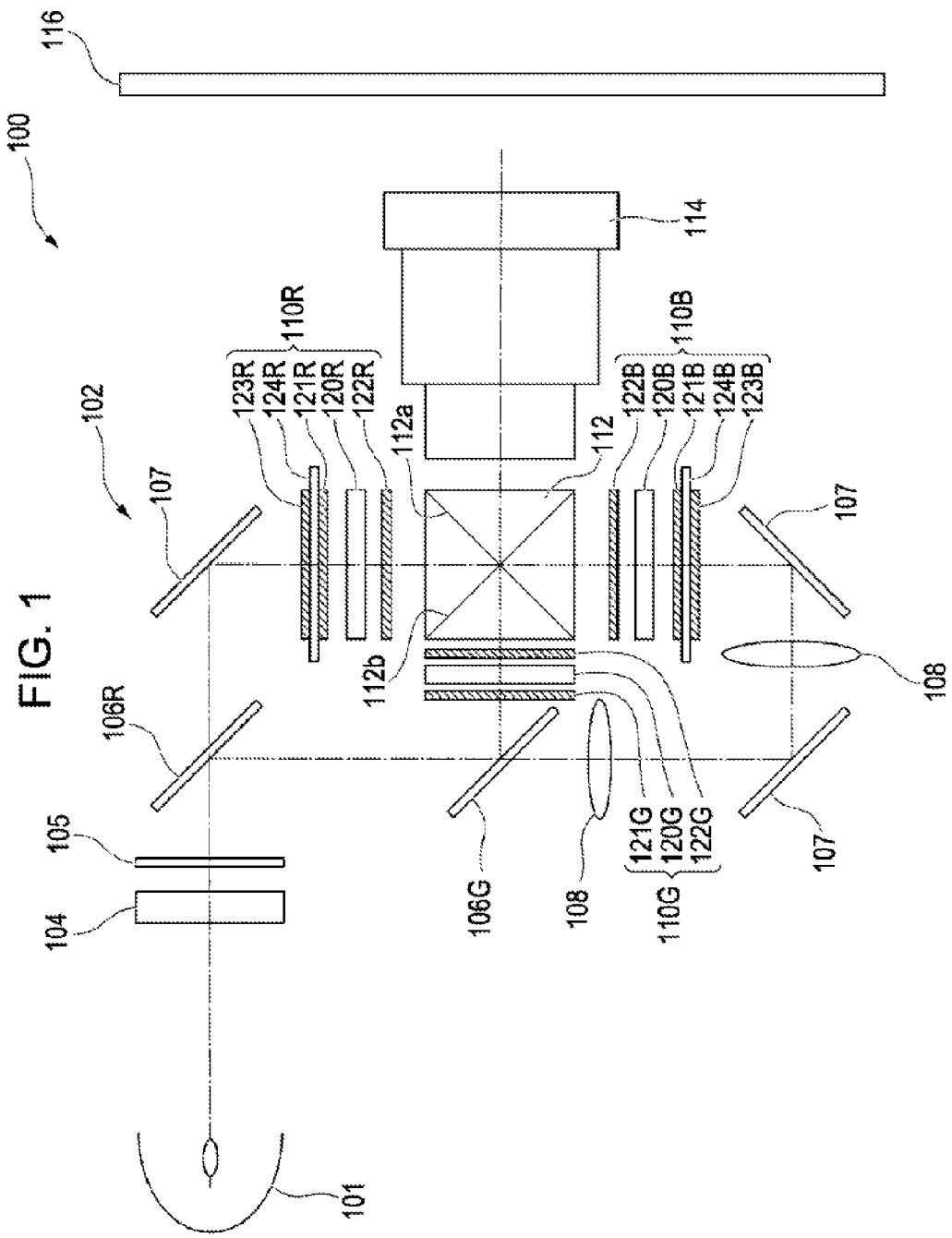
FIG. 1 is a schematic diagram illustrating an optical system of a projector according to a first embodiment of the invention.

Hereinafter, embodiments of the invention will be described with reference to the drawings. The embodiments are examples of the invention. The invention is not limited thereto, but may be modified arbitrarily within the technical spirit of the invention. In the drawings described below, the scales or number of units of the configuration may be different from those of the actual configuration in order to facilitate the configuration.

First Embodiment

Projector

FIG. 1 is a schematic diagram illustrating an optical system of a projector 100 according to a first embodiment of the invention.

As shown in FIG. 1, the projector 100 includes a light source device 101, an integrator 104, a polarization conversion element 105, a color separation light-guiding optical system 102, a liquid crystal light-modulation device 110R, a liquid crystal light-modulation device 110G, and a liquid crystal light-modulation device 110B serving as a light modulation device, a cross-dichroic prism 112, and a projection optical system 114.

The light source device 101 supplies light including red light (hereinafter, referred to as "R light") serving as first color light, green light (hereinafter, referred to as "G light") serving as second color light, and blue light (hereinafter, referred to as "B light") serving as third color light. For example, an extra high pressure mercury lamp can be used as the light source device 101.

The integrator 104 uniformizes the illuminance distribution of the light from the light source device 101. The polarization conversion element 105 converts the light with the uniformized illuminance distribution into polarized light having a specific vibration direction, for example, a s-polarized light subjected to s polarization with respect to a reflection surface of the color separation light-guiding optical system 102. The light converted into the s-polarized light is incident on an R light transmitting dichroic mirror 106R of the color separation light-guiding optical system 102.

The color separation light-guiding optical system 102 includes an R light transmission dichroic mirror 106R, a B light transmission dichroic mirror 106G, three reflecting mirrors 107, and two relay lens 108.

The R light transmission dichroic mirror 106R transmits the R light and reflects the G light and the B light. The R light transmitted through the R light transmission dichroic mirror 106R is incident on the reflection mirror 107. The reflection mirror 107 bends the light path of the R light by 90 degrees. The R light of which the light path is bent is incident on the R light liquid crystal light-modulation device 110R. The R light liquid crystal light-modulation device 110R is a transmissive liquid crystal device that modulates the R light in accordance with an image signal.

The R light liquid crystal light-modulation device 110R includes a λ/2 retardation plate 123R, a glass plate 124R, a first polarization plate 121R, a liquid crystal device 120R, and a second polarization plate 122R. The λ/2 retardation plate 123R and the first polarization plate 121R are disposed so as to come into contact with the light transmission glass plate 124R that does not convert the polarization direction. In FIG. 1, the second polarization plate 122R is independently disposed, but may be disposed so as to come into contact with an exit surface of the liquid crystal device 120R or an incident surface of the cross-dichroic prism 112.

The light paths of the G light and the B light reflected from the R light transmission dichroic mirror 106R are bent by 90 degrees. The G light and the B light of which the light paths are bent are incident on the B light transmission dichroic mirror 106G. The B light transmission dichroic mirror 106G reflects the G light and transmits the B light. The G light reflected from the B light transmission dichroic mirror 106G is incident on the G light liquid crystal light-modulation device 110G. The G light liquid crystal light-modulation device 110G is a transmissive liquid crystal device that modulates the G light in accordance with an image signal. The G light liquid crystal light-modulation device 110G includes a liquid crystal device 120G, a first polarization plate 121G, and a second polarization plate 122G.

The G light incident on the G light liquid crystal light-modulation device 110G is converted into the s-polarized light. The s-polarized light incident on the G light liquid crystal light-modulation device 110G is transmitted through the first polarization plate 121G without change and is incident on the liquid crystal device 120G. The s-polarized G light incident on the liquid crystal device 120G is converted into p-polarized light by modulation in accordance with an image signal. The G light converted into the p-polarized light by the modulation of the liquid crystal device 120G exits from the second polarization plate 122G. In this way, the G light modulated by the G light liquid crystal light-modulation device 110G is incident on the cross-dichroic prism 112.

The B light transmitted through the B light transmission dichroic mirror 106G is incident on the B light liquid crystal light-modulation device 110B via the two relay lenses 108 and the two reflection mirrors 107. The B light liquid crystal light-modulation device 110B is a transmissive liquid crystal device that modulates the B light in accordance with an image signal. The B light liquid crystal light-modulation device 110B includes a λ/2 retardation plate 123B, a glass plate 124B, a first polarization plate 121B, a liquid crystal device 120B, and a second polarization plate 122B.

The B light incident on the B light liquid crystal light-modulation device 110B is converted into s-polarized light. The s-polarized light incident on the B light liquid crystal light-modulation device 110B is converted into p-polarized light by the λ/2 retardation plate 123B. The B light converted into the p-polarized light is transmitted through the glass plate 124B and the first polarization plate 121B without change and is incident on the liquid crystal device 120B. The p-polarized B light incident on the liquid crystal device 120B is converted into s-polarized light by modulation in accordance with an image signal. The B light converted into the s-polarized light by the modulation of the liquid crystal device 120B exits from the second polarization plate 122B. The B light converted by the B light liquid crystal light-modulation device 110B is incident on the cross-dichroic prism 112.

The R light transmission dichroic mirror 106R and the B light transmission dichroic mirror 106G of the color separation light-guiding optical system 102 separates the light supplied from the light source device 101 into the R light serving as the first color light, the G light serving as the second color light, and the B light serving as the third color light.

The cross-dichroic prism 112 which is a color synthesizing optical system is configured such that two dichroic films 112a and 112b are perpendicular to each other in an X shape. The dichroic film 112a reflects the B light and transmits the G light. The dichroic film 112b reflects the R light and transmits the G light. In this way, the cross-dichroic prism 112 synthesizes the R light, the G light, and the B light modulated respectively by the R light liquid crystal light-modulation device 110R, the G light liquid crystal light-modulation device 110G, and the B light liquid crystal light-modulation device 110B.

The projection optical system 114 projects the light synthesized by the cross-dichroic prism 112 to a screen 116. In this way, a full-color image can be obtained on the screen 116.

Liquid Crystal Device

The projector 100 described with reference to FIG. 1 includes the three liquid crystal devices 120R, 120G, and 120B. The three liquid crystal devices 120R, 120G, and 120B are different from each other in the wavelength domain of the modulated light and the basic configuration is the same. Therefore, the liquid crystal device 120R will be exemplified.

Figure 2:
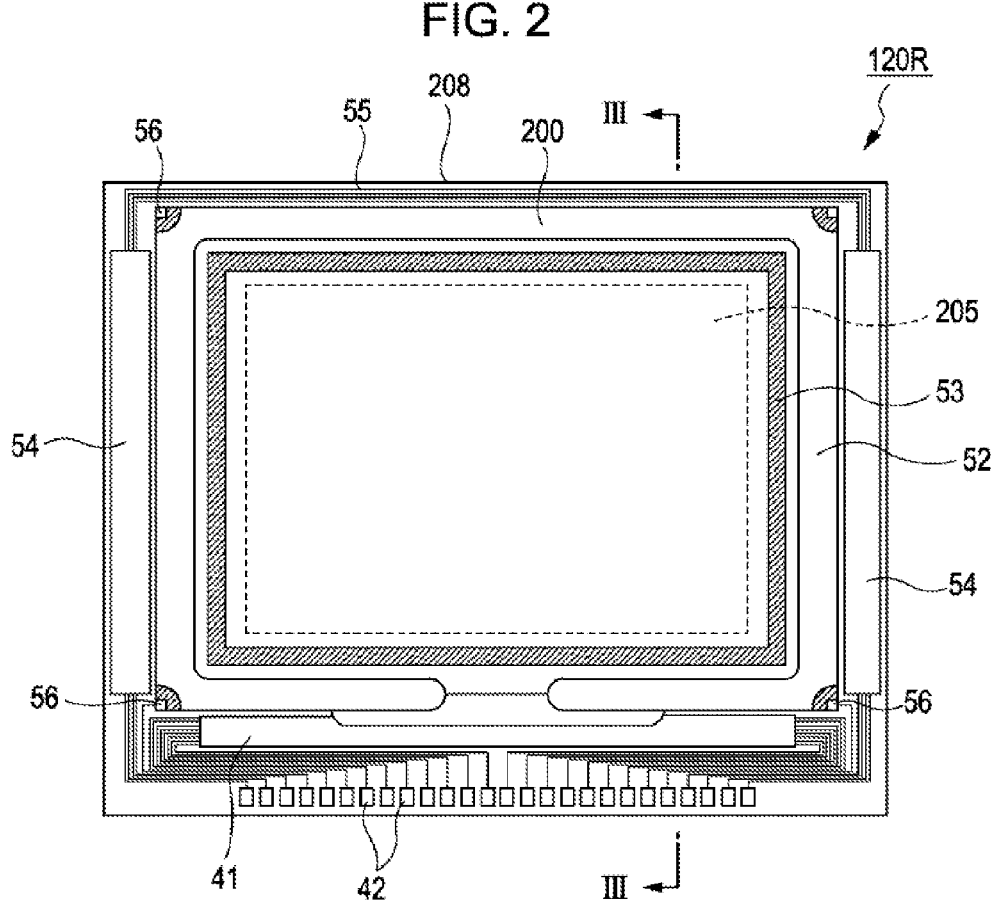
FIG. 2 is a plan view illustrating the overall configuration of a liquid crystal device according to the first embodiment of the invention.
Figure 3:
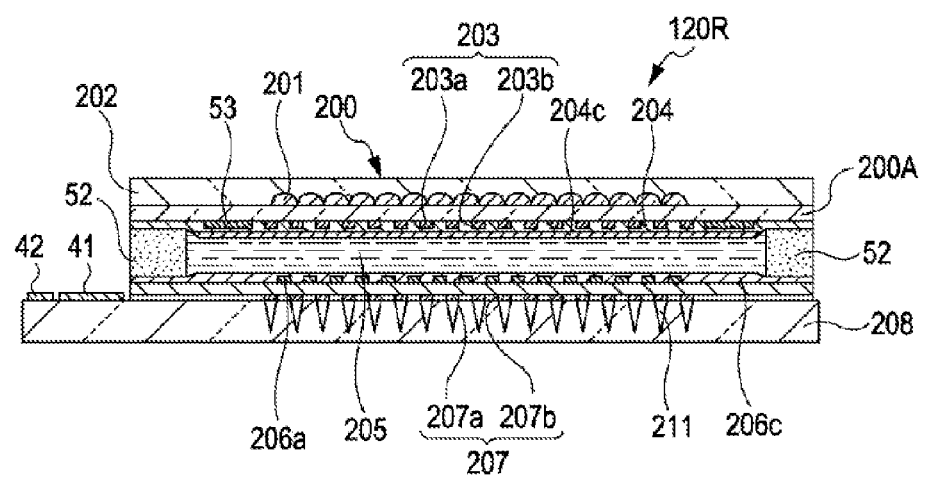
FIG. 3 is a sectional view illustrating the configuration of the liquid crystal device according to the first embodiment of the invention.

FIG. 2 is a plan view illustrating the general configuration of the liquid crystal device 120R. FIG. 3 is a sectional view illustrating the configuration of the liquid crystal device 120R. FIG. 3 is the sectional view taken along the line III-III of FIG. 2.

As shown in FIG. 2, the liquid crystal device 120R has a configuration in which a TFT array substrate (second substrate) 208 and a counter substrate (first substrate) 200 are superimposed onto each other and are bonded by a sealing member 52 interposed therebetween. A liquid crystal layer 205 is sealed inside a region partitioned by the sealing member 52. A peripheral break line 53 made of a light-shielding material is formed inside the region where the sealing member 52 is formed.

In a region outside the sealing member 52, a data line driving circuit 41 and external circuit mounting terminals 42 are formed along one side of a TFT array substrate 208 and scanning line driving circuits 54 are formed along two sides adjacent to the one side. A plurality of wirings 55 connecting the scanning line driving circuits 54 installed in both sides of an image display region are installed along the remaining one side of the TFT array substrate 208. Inter-substrate conductive members 56 electrically connecting the TFT array substrate 208 and the counter substrate 200 to each other are disposed in the corners of the counter substrate 200.

Instead of the configuration in which the data line driving circuit 41 and the scanning line driving circuits 54 are formed on the TFT array substrate 208, for example, a TAB (Tape Automated Bonding) substrate mounted with a driving LSI may be electrically and mechanically connected to a terminal group formed in the peripheral section of the TFT array substrate 208 with an anisotropic conductive film interposed therebetween.

As shown in FIG. 3, a lens array 202 (micro-lens array) including a plurality of condensing lenses 201 (micro-lenses) is disposed on the light incident side of the liquid crystal device 120R. The lens array 202 is fixed to a counter substrate body 200A with an optical adhesive or the like (not shown) having optical transparency. The plurality of condensing lenses 201 of the lens array 202 are disposed to overlap a plurality of pixels, respectively. The lens array 202 has a configuration in which the plurality of condensing lenses 201 are arranged in a matrix form. The condensing lenses 201 have a function of condensing light incident from the side of the counter substrate 200 into the inside of an opening portion 203b (light transmission region) of a light-shielding section 203. The counter substrate 200 has a configuration in which the counter substrate body 200A and the lens array 202 are adhered to each other, but the invention is not limited thereto. For example, the plurality of condensing lenses 201 may be formed in the counter substrate 200.

Light-shielding layers 203a (light-shielding region) and a common electrode 204 are formed on the inside surface of the counter substrate 200 (the counter substrate body 200A). An alignment film 204c is formed on the common electrode 204.

Light-shielding sections 207, pixel electrodes 206a, TFTs (Thin Film Transistor) 225 driving the pixel electrodes 206a, an alignment film 206c, and prism elements 211 are formed in the TFT array substrate 208.

A light-shielding layer 207a (light-shielding region) is formed in a lattice shape on the prism elements 211. The light-shielding layer 207a includes a data line 221 and a scanning line 222. The light-shielding layer may be separated from the data lines and the scanning lines.

Figure 6:
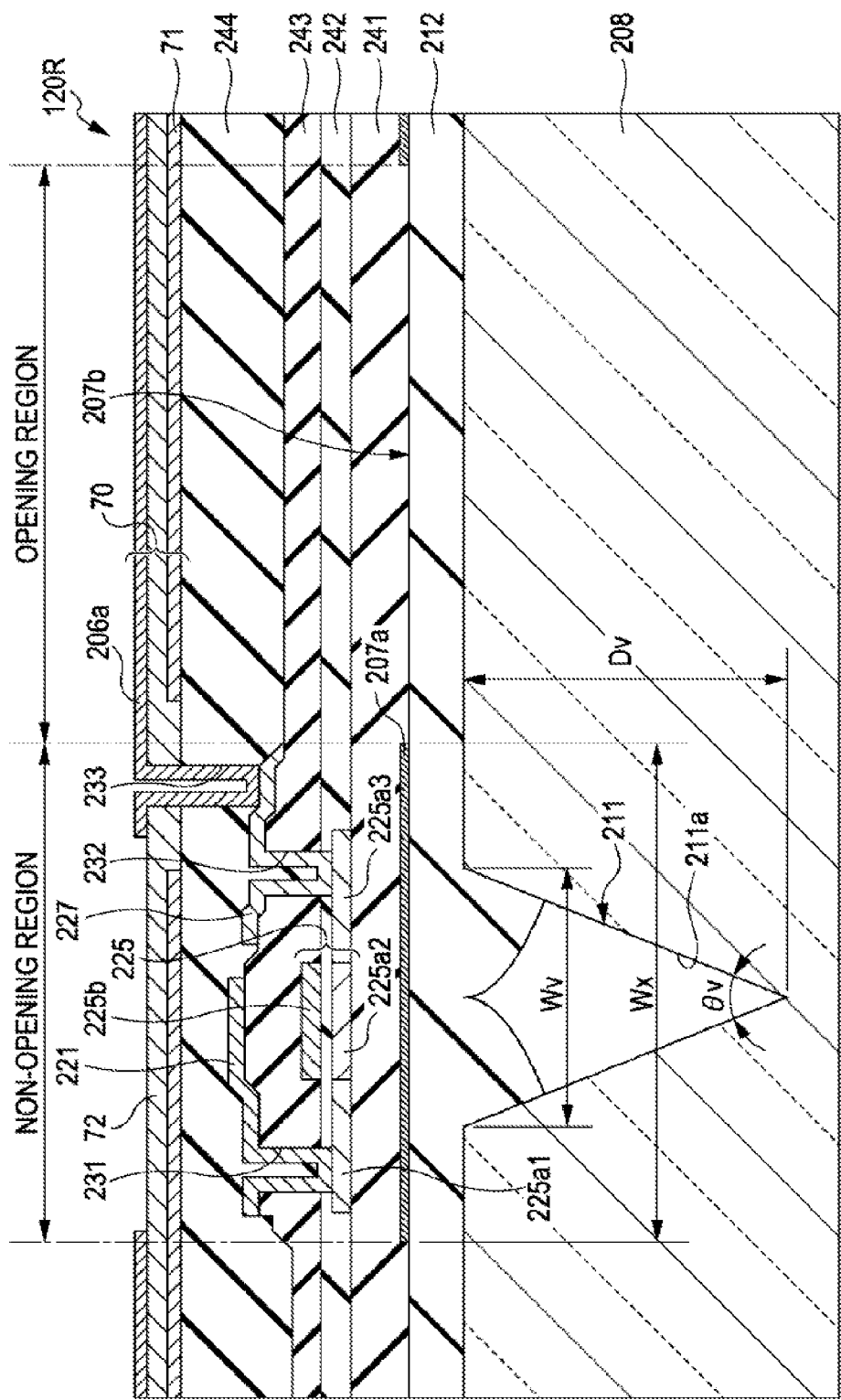
FIG. 6 is a sectional view illustrating the configuration of a part of the liquid crystal device according to the first embodiment of the invention.

A rectangular region surrounded by the light-shielding layer 207a is configured as an opening portion 207b (see FIG. 6, a light transmission region). The opening portion 207b is a pixel section through which the R light from the light source device 101 passes. The prism element 211 has a function of condensing the light that has been incident from the side of the counter substrate 200 and has passed through the condensing lens 201, the liquid crystal layer 205, and the opening portion 207b.

The pixel electrode 206a is disposed to overlap the opening portion 207b in a plan view. A groove and the light-shielding layer 207a corresponding to the prism element 211 are disposed to overlap a region between two pixel electrodes 206a adjacent to each other. The TFT 225 (see FIG. 4) and a wiring (not shown) supplying an electric signal to this TFT 225 are disposed in a region overlapping the light-shielding layer 207a in a plan view. The alignment film 206c is formed on the surfaces of the pixel electrodes 206a and the TFTs 225.

A liquid crystal layer 205 is sealed between the alignment film 206c on the side of the TFT array substrate 208 and the alignment film 204c on the side of the counter substrate 200. The R light from the light source device 101 is incident on the liquid crystal device 120R from the upper side of FIG. 3, passes through the opening portions 203b, the common electrode 204, the alignment film 204c, the liquid crystal layer 205, the alignment film 206c, and the pixel electrodes 206a in this order, and exits from the side of the TFT array substrate 208 toward the screen 116. At this time, the polarization component of the R light is modulated in the liquid crystal layer 205.

Figure 4:
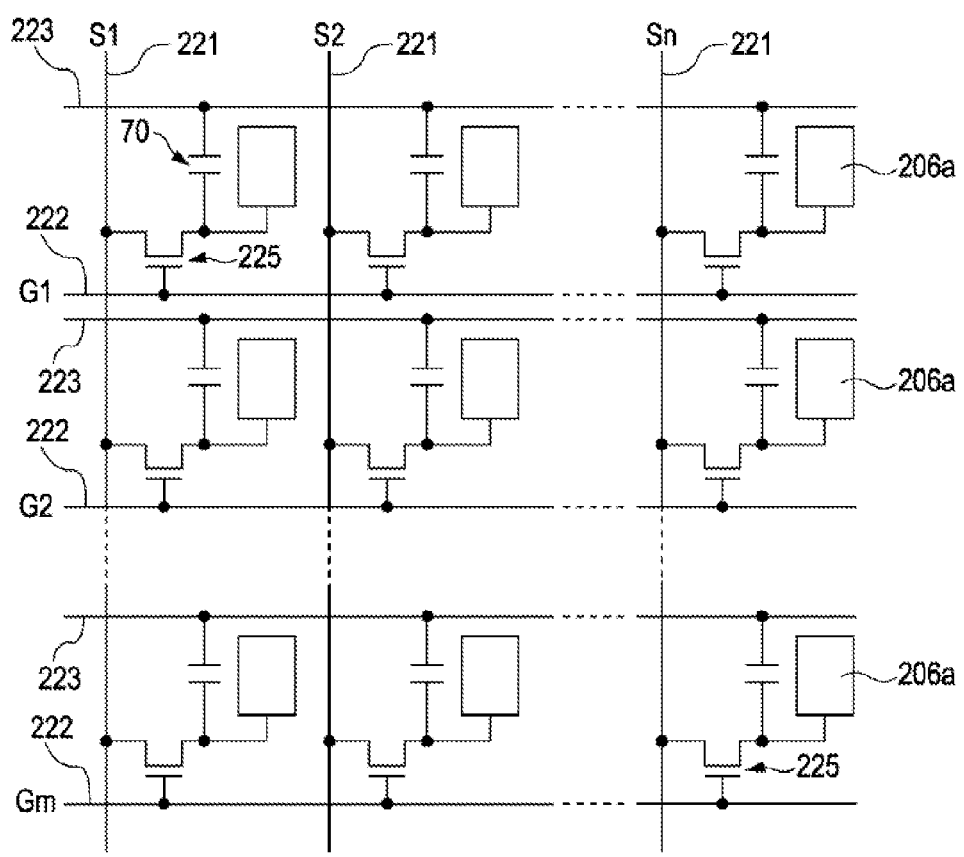
FIG. 4 is a circuit diagram illustrating the electric configuration of the liquid crystal device according to the first embodiment of the invention.

FIG. 4 is a circuit diagram illustrating the electric configuration of the liquid crystal device 120R.

As shown in FIG. 4, the pixel electrode 206a and the TFT 225 are formed in each of the plurality of pixels forming the image display region and formed in a matrix form. The TFT 225 is electrically connected to the pixel electrode 206a. When the liquid crystal device 120R operates, the TFT 225 controls switching the pixel electrode 206a so as to switch supply or non-supply of an image signal to the pixel electrode 206a. The data line 221 through which the image signal is supplied is electrically connected to a source region of the TFT 225.

The scanning line 222 is electrically connected to a gate of the TFT 225. The liquid crystal device 120R is configured to apply pulsed scanning signals G1, G2, . . . , Gm in this order sequentially to the scanning lines 222 at a predetermined timing. The pixel electrode 206a is electrically connected to a drain of the TFT 225. In the pixel electrodes 206a, image signals S1, S2, . . . , Sn supplied from the data lines 221 are written to the liquid crystal of the respective pixels at a predetermined timing by closing the TFTs 225 serving as switching elements only during a given period.

The image signals S1, S2, . . . , Sn written to the liquid crystal and having a predetermined level are held by a liquid crystal capacitor formed between the pixel electrodes 206a and the common electrode 204 formed in the counter substrate 200. A storage capacitor 70 is formed between the pixel electrode 206a and the capacitor line 223 to prevent the held image signal from being leaked and is disposed in parallel to the liquid crystal capacitor. In this way, when the voltage signal is applied to the liquid crystal, the alignment state of the liquid crystal is changed in accordance with the level of the applied voltage signal. Thus, the light incident on the liquid crystal is modulated, so that a gray scale display can be enabled.

In the liquid crystal of the liquid crystal layer 205, the light is modulated and the gray scale display is enabled by varying the alignment or order of the molecules in accordance with the level of the applied voltage signal. For example, in a case of a normally white mode, the transmittance of the incident light is decreased in a pixel unit in accordance with the applied voltage. In a case of a normally black mode, the transmittance of the incident light is increased in a pixel unit in accordance with the applied voltage. Thus, light with the contrast corresponding to the image signal exits from the liquid crystal device as a whole.

Figure 5:
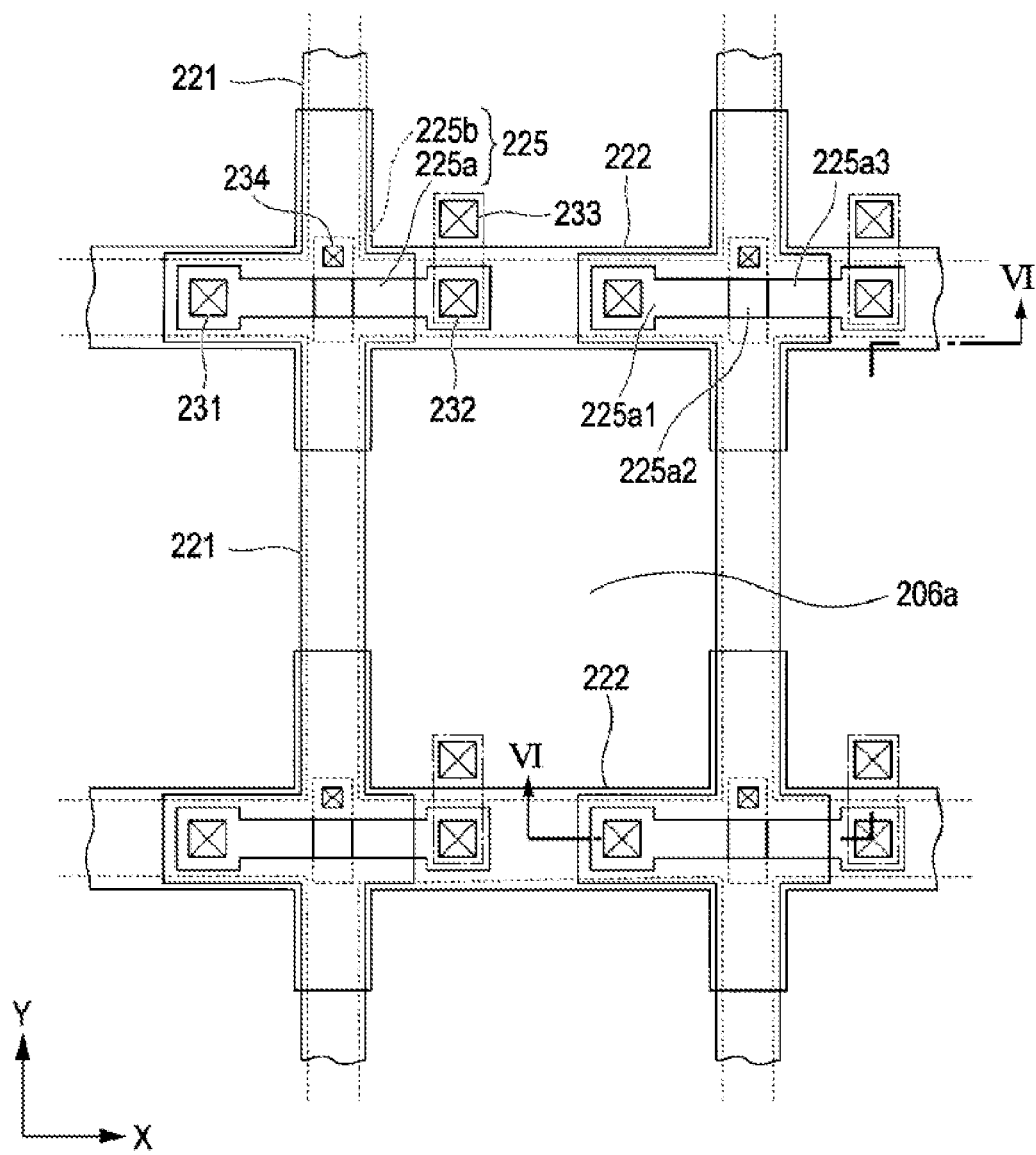
FIG. 5 is a schematic diagram illustrating a positional relationship of wirings in an image display region of the liquid crystal device according to the first embodiment of the invention.

FIG. 5 is a schematic diagram illustrating a position relationship of wirings or the like in the image display region of the liquid crystal device 120R.

As shown in FIG. 5, the scanning lines 222 and the data lines 221 forming the light-shielding layer 207a of the invention extend in the X and Y directions on the TFT array substrate 208. In the vicinity of each of the intersections between the data lines 221 and the scanning lines 222, the TFT 225 (the semiconductor layer 225a and the gate electrode 225b) overlaps the scanning line 222. The scanning line 222 is made of a light-shielding conductive material such as W (tungsten), Ti (titanium), or TiN (titanium nitride). The scanning line 222 is larger than the width of the semiconductor layer 225a so as to contain the semiconductor layer 225a of the TFT 225. The scanning line 222 is disposed to be lower than the semiconductor layer 225a. Since the scanning line 222 has a light-shielding property, the scanning line 222 and the data line 221 define a non-opening region of the image display region.

The width of the data line 221 may be identical with or may be different from the width of the scanning line 222. In this embodiment, the width of the data line 221 is different from the width of the scanning line 222. The width of the scanning line 222 is larger than the width of the data line 221. A width Wv of a groove 211a of the prism element 211 formed in the lower layer of the light-shielding layer 207a formed by the data line 221 and the scanning line 222 is identical with a portion (Wv1) overlapping the data line 221 and a portion (Wv2) overlapping the scanning line 222 (see FIG. 7).

The TFT 225 includes the semiconductor layer 225a and the gate electrode 225b. The semiconductor layer 225a includes a source region 225a1 a channel region 225a2, and a drain region 225a3. Further, an LDD (Lightly Doped Drain) region may be formed in the interface between the channel region 225a2 and the source region 225a1 or in the interface between the channel region 225a2 and the drain region 225a3.

The gate electrode 225b is formed in a region overlapping the channel region of the semiconductor layer 225a with a gate insulation film interposed therebetween in a plan view on the TFT array substrate 208. Although not illustrated in the drawing, the gate electrode 225b is electrically connected to the scanning line 222 disposed in the lower layer with a contact hole 234 interposed therebetween, and thus controls ON/OFF of the TFT 225 by applying a scanning signal.

Since the data line 221 overlaps the TFT 225 on the TFT 225, the TFT 225 can be shielded from light from the upper side of the TFT 225. The data line 221 is electrically connected to the contact hole 231 which is an example of an "input terminal" of the invention. The data line 221 is electrically connected to the source region 225a1 (see FIG. 6) of the TFT 225 and forms a part of the data line supplying an image signal to the TFT 225.

On the other hand, the drain region 225a3 is electrically connected to the pixel electrode 206a via a contact hole 232 and a relay layer 227, which form an example of an "output terminal" of the invention, and a contact hole 233, which is an example of a "connection portion" of the invention (see FIG. 6).

FIG. 6 is a sectional view illustrating the configuration of a part of the liquid crystal device 120R. FIG. 6 is the sectional view taken along the line VI-VI of FIG. 5.

As shown in FIG. 6, insulation films 241, 242, 243 and 245 and a dielectric film 72 are formed on the TFT array substrate 208. The scanning line 222, the TFT 225, the data line 221, a capacitor electrode 71, and the pixel electrode 206a are formed on the TFT array substrate 208, the insulation film 241, the insulation film 243, the insulation film 244, and the dielectric film 72, respectively.

The capacitor electrode 71 is made of a transparent conductive material such as ITO. The capacitor electrode 71 and the pixel electrode 206a form a pair of capacitor electrodes of the storage capacitor 70. The capacitor electrode 71 nearly overlaps the entire image display region and extends toward the upper layer of the data line 221 in an opening region through which light can pass.

The dielectric film 72 is a transparent film formed on the capacitor electrode 71 in an opening region through which light can pass. The dielectric film 72 is made of alumina with permittivity relatively higher than that of other dielectric films. The dielectric film 72, the capacitor electrode 71, and the pixel electrode 206a form the storage capacitor 70. The permittivity of alumina is relatively higher than other dielectric materials. Therefore, when the size of the storage capacitor 70 is constant, it is possible to increase the capacitance value which can be set. Further, the thickness of the dielectric film 72 may be thin to increase the capacitance value of the storage capacitor 70.

Prism Element

The prism element 211 is disposed at a position overlapping the light-shielding layer of the TFT array substrate 208 in a plan view. The prism element 211 includes the V-shaped groove 211a formed in the TFT array substrate 208.

The width Wv of the groove 211a of the prism element 211 is less than a width Wx of the light-shielding layer. Further, the width Wv of the groove 211 may be nearly identical with the width Wx of the light-shielding layer. That is, the width Wv of the groove 211 may be equal to or less than the width Wx of the light-shielding layer.

A depth Dv of the groove 211a of the prism element 211 is greater than the width Wv of the groove 211a. For example, when the width Wv of the groove 211a is in the range of 1.5 μm to 2 μm, the depth Dv of the groove 211a can be set to be in the range of 15 μm to 20 μm.

A cover portion 212 occupying a part (an opening portion of the upper side) of the groove 211a close to the liquid crystal layer 205 is formed between the light-shielding layer 207a and the prism element 211. The surface of the cover portion 212 on the side of the light-shielding layer is configured as a flat surface.

The inside (a region surrounded by the groove 211a and the cover portion 212) of the groove 211a is a void (for example, an air layer or vacuum). The prism element 211 is configured so as to have a refractive index (for example, n=1.0) less than the refractive index (for example, n=1.4) of the TFT array substrate 208 or the cover portion 212, since the inside of the groove 211a is the void.

Figure 7:
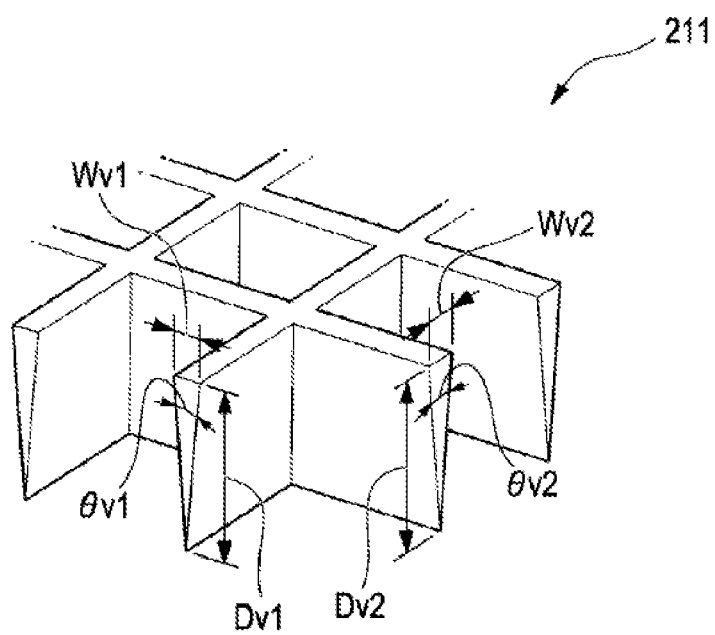
FIG. 7 is a perspective view illustrating a prism element according to the first embodiment of the invention.

FIG. 7 is a perspective view illustrating the prism element.

As shown in FIG. 7, the prism element 211 includes the lattice-shaped groove 211a. In FIG. 7, it is assumed that Wv1 is the width of a portion overlapping the data line of the groove 211a, Wv2 is the width of a portion overlapping the scanning line, Dv1 is the depth of a portion overlapping the data line of the groove 211a, Dv2 is the depth of a portion overlapping the scanning line, θv1 is the angle of the front end portion of a portion overlapping the data line of the groove 211a, and θv2 is the angle of the front end portion of a portion overlapping the scanning line.

The width Wv1 of the portion overlapping the data line of the groove 211a is identical with the width Wv2 of the portion overlapping the scanning line (where Wv1=Wv2). The depth Dv1 of the portion overlapping the data line of the groove 211a is identical with the Dv2 of the portion overlapping the scanning line (where Dv1=Dv2). Thus, the angle θv1 of the front end portion of the portion overlapping the data line of the groove 211a is identical with the angle θv2 of the front end portion of the portion overlapping the scanning line (where θv1=θv2).

Figure 8:
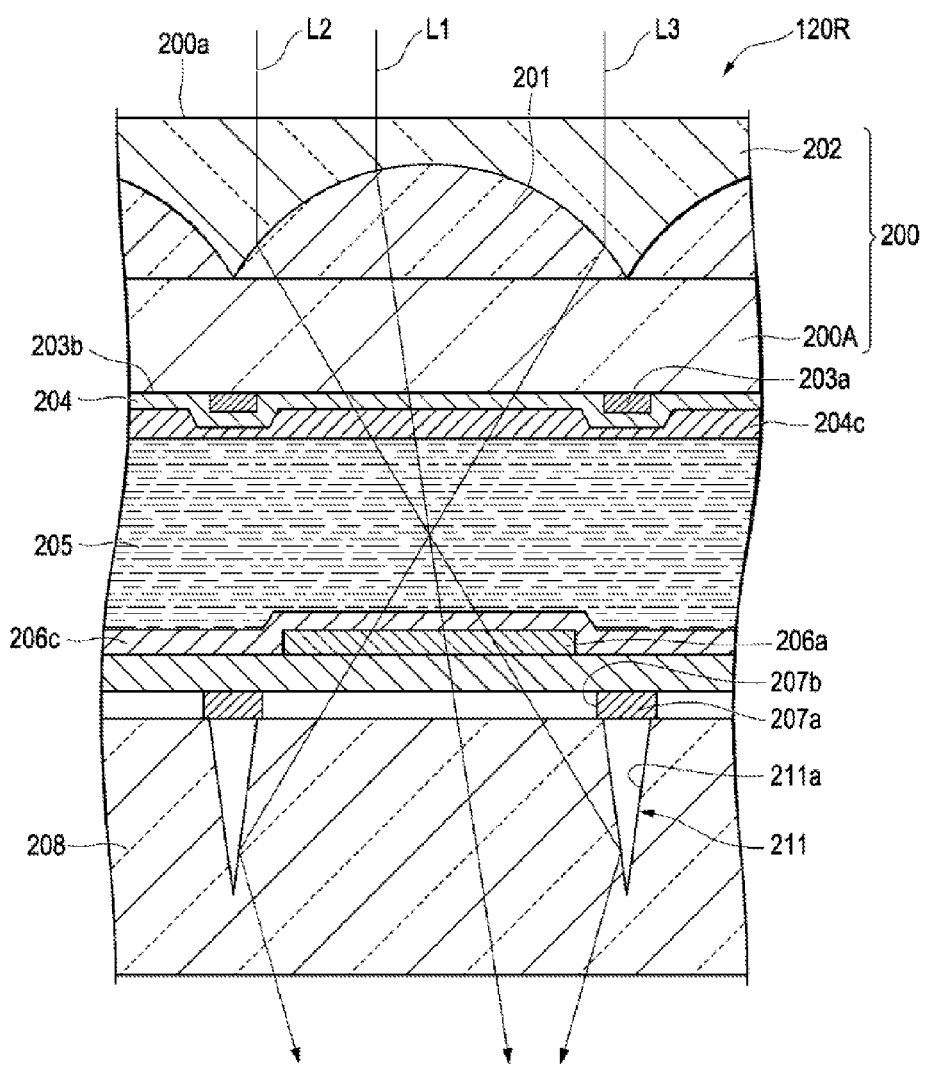
FIG. 8 is a diagram for describing an operation of the prism element according to the first embodiment of the invention.

FIG. 8 is a diagram for describing an operation of the prism element 211. In FIG. 8, L1, L2, and L3 are light rays incident on the liquid crystal device 120R. The light rays L1, L2, and L3 are reflected or refracted in an interface where there is a difference in a refractive index. In order to facilitate the description in FIG. 8, a light path is illustrated such that a light ray travels straight in an interface where there is a minute difference in the refractive index.

First, the light ray L1 directly incident on the opening portion 207b without passing through the prism element 211 will be described. The light ray L1 travelling in the air is incident on an incident surface 200a of the counter substrate 200. Then, the right ray L1 is transmitted through the counter substrate 200 and is transmitted through the common electrode 204 and the liquid crystal layer 205 from the opening portion 203b. The light ray L1 modulated in accordance with an image signal is transmitted through the pixel electrode 206a and exits from the TFT array substrate 208. The light ray L1 is converged to a focus distant by a predetermined distance from the light-exiting surface of the TFT array substrate. Thereafter, the converged light ray L1 is projected to the screen 116 (not shown) via the projection optical system 114.

Next, the light rays L2 and L3 incident (incident on the position overlapping the light-shielding layer 203a) on a position different from that of the light ray L1 will be described. The light rays L2 and L3 are incident on the incident surface 200a of the counter substrate 200. The light rays L2 and L3 travelling through the counter substrate 200 are incident on the condensing lens 201 and are condensed toward the pixel electrode 206a. The light rays L2 and L3 condensed by the condensing lens 201 spread while passing through the liquid crystal layer 205. The light rays L2 and L3 spreading while passing through the liquid crystal layer 205 are incident on the inclined surface of the prism element 211.

Since the inside of the prism element 211 is a void, the refractive index of the prism element 211 is less than that of the TFT array substrate 208. In this embodiment, the prism element 211 has a refractive index obtained when the incident light rays L2 and L3 are totally reflected from the inclined surface of the prism element 211. The light paths of the light rays L2 and L3 are changed when the light rays L2 and L3 are totally reflected from the inclined surface of the prism element 211.

As described above, various light rays L1, L2, and L3 travel toward the opening portion 207b from, for example, the light source device 101 serving as a light source unit. The light ray L1 nearly directly incident on the opening portion 207b is modulated in accordance with the image signal without change and exits from the TFT array substrate 208.

On the other hand, the light rays L2 and L3 obliquely incident in the direction of the light-shielding layer 207a, which is a non-modulation region in the vicinity of the opening portion 207b, are incident on the prism element 211 serving as a light path changing unit disposed in the vicinity of the opening portion 207b. The light rays L2 and L3 incident on the prism element 211 are reflected in the direction of the opening portion 207b. In this way, the light paths of the light rays L2 and L3 which are not originally incident on the opening portion 207b can efficiently be guided to the opening portion 207b.

The light exiting from the liquid crystal device 120R is projected to the screen 116 without collision by the projection optical system 114. In this way, the light rays L1 and L2 can efficiently be guided to the opening portion 207b.

Method of Manufacturing Liquid Crystal Device

Figure 9A:
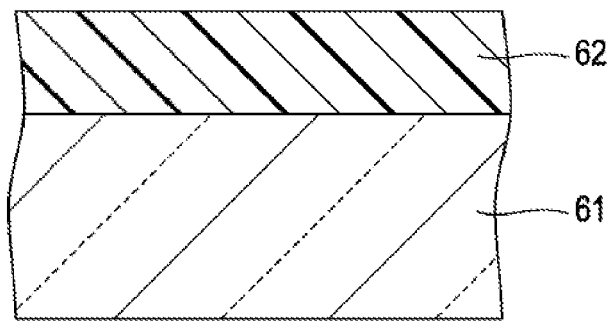
FIGS. 9A to 9C are sectional views illustrating steps of a method of manufacturing the liquid crystal device according to the first embodiment of the invention.
Figure 9B:
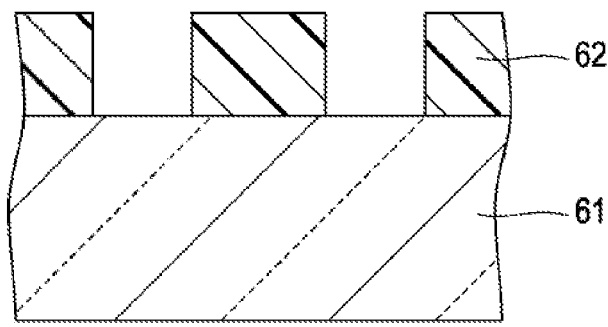
Figure 9C:
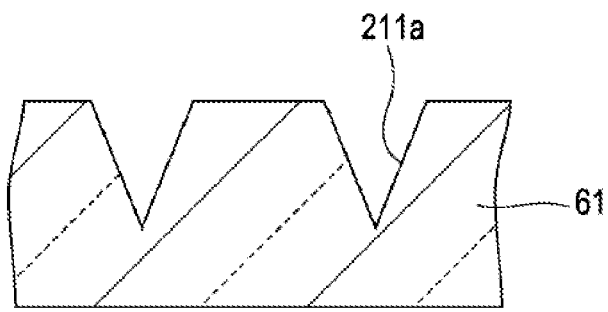
Figure 10A:
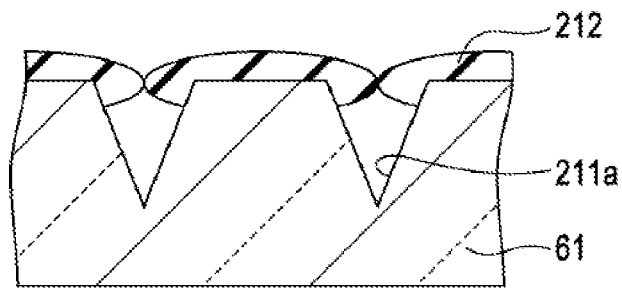
FIG. 10A to 10C are sectional views illustrating steps of the method of manufacturing the liquid crystal device according to the first embodiment of the invention.
Figure 10B:
Figure 10C:
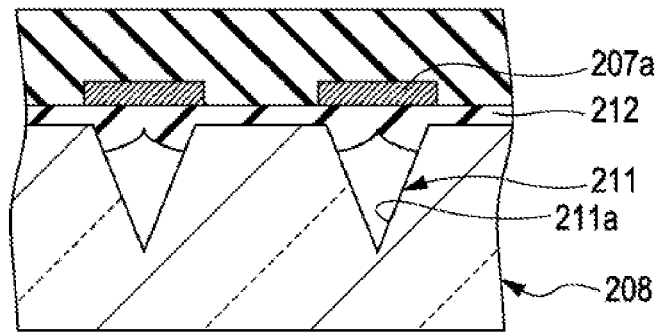

FIGS. 9A to 10C are sectional views illustrating a method of manufacturing the liquid crystal device. Next, a step of forming the prism elements 211 in the TFT array substrate 208 in the liquid crystal device 120R with the above-described configuration and a step of forming the light-shielding layers 207a will be described. FIGS. 9A to 9C show a step of the forming the grooves 211a of the prism elements 211. FIGS. 10A to 10C shows a step of forming the cover portions 212 in the upper portion of the grooves 211a of the prism elements 211 and a step of forming the light-shielding layers 207a on the cover portions 212.

The grooves 211a of the prism elements 211 can be formed in accordance with a method of a laser application or a method of using a dry etching process. In the method of the laser application, the prism elements can be formed by emitting a $CO_2$ laser to a transparent substrate based on preset data. In steps shown in FIGS. 9A to 9C, the grooves 211a are formed by a dry etching process of using a thick film resist.

First, as shown in FIG. 9A, a resin resist layer 62 is formed on a substrate 61. The substrate 61 can be formed of a glass substrate or a transparent resin substrate. The resin resist layer 62 is a mask layer and is applied so as to have a thickness in the range of, for example, 50 μm to 200 μm. Next, as shown in FIG. 9B, a patterning process is performed to remove the resin resist layer 62 at positions where the prism elements 211 are formed.

Next, a dry etching process is performed using the patterned resin resist layer 62 as a hard mask. In the dry etching process, an ICP dry etching apparatus capable of high-density plasma is used. As shown in FIG. 9C, the grooves 211a with a single-surface isosceles triangle shape are formed in the substrate 61 by a dry etching process. As an etching gas used to uniformly form high-density plasma in an etched area, a fluoride-based gas such as $C_4F_8$ or $CHF_3$ is preferably used.

The grooves 211a having a depth which is four times the thickness of the resin resist layer 62 can be formed in the substrate 61 by setting etching selectivity of the material of the substrate 61 to the material of the resin resist layer 62 to 4:1. In order to prevent the carbonization of the resist in the etching environment, not only the substrate 61 may be cooled by a chiller but it may also be necessary to take a cooling time between etching cycles.

Next, a step of forming the cover portions 212 of the prism elements 211 in the upper portions of the grooves 211a of the prism elements 211 and a step of forming the light-shielding layer 207a on the cover portions 212 will be described with reference to FIGS. 10A to 10C.

First, as shown in FIG. 10A, the cover portions 212 covering the opening portions on the upper sides of the grooves 211a are formed. The cover portions 212 are preferably made of a material which has an insulation property and is capable of physically and chemically protecting the grooves 211a. In this embodiment, silicon oxide ($SiO_2$), silicon nitride (SiN), or the like used to form an insulation film which can be formed in the same process as the process of manufacturing the TFTs is used. A CVD method or the like is used as a method of forming the cover portions 212.

Next, as shown in FIG. 10B, the upper surfaces of the cover portions 212 are flattened by chemical mechanical polishing (CMP). The thickness of the cover portion 212 may be set to the extent that the light-shielding layer 207a can be formed on the groove 211a with the cover portion 212 interposed therebetween and the above-described protection function can be realized. For example, the thickness of the cover portion 212 is preferably in the range of 1 μm to 10 μm. When the thickness of the cover portion 212 is less than 1 μm, it is difficult to form the light-shielding layer 207a on the groove 211a. Further, when the thickness of the cover portion 212 is greater than 10 μm, the light-shielding layer 207a may be too distant from the prism element. Therefore, the light which has passed and spread through the light-shielding layer 207a may not be reflected from the prism element in some cases.

Next, as shown in FIG. 10C, the light-shielding layer 207a is formed on the upper surface of the cover portion 212. The light-shielding layer 207a made of a metal material such as Cr or Al or black resin is formed on the cover portion 212. A known film forming method such as a sputtering method or a CVD method can be used as the method of forming the light-shielding layer 207a.

Thereafter, the TFT array substrate 208 can be manufactured by forming the pixel electrodes, the alignment films, and the like. Then, the liquid crystal device 120R can be manufactured by bonding the TFT array substrate 208 to the counter substrate 200 separately manufactured and sealing the liquid crystal layer 205 between the TFT array substrate 208 and the counter substrate 200.

In the liquid crystal device 120R according to this embodiment, the light incident on the light-shielding section 203 by the condensing lens 201 is converged into the opening portion 207b of the light-shielding section 207 and the light which has passed and spread through the opening portion 207b by the prism element 211 is condensed. Since the groove 211a is formed in the TFT array substrate 208 and the prism element 211 including the groove 211a can be formed, it is easy to position the prism element 211. Accordingly, it is possible to provide the liquid crystal device 120R which is capable of realizing the high light use efficiency and is easily manufactured.

With such a configuration, the light which has passed and spread through the opening portion 207b of the light-shielding portion 207 can reliably be condensed. On the other hand, when the depth Dv of the groove 211a is less than the width Wv of the groove 211a, the light which has passed and spread through the opening portion 207b of the light-shielding section 207 may not sufficiently be condensed in some cases.

With such a configuration, the angle θv1 of the front end portion of the portion overlapping the data line 221 in the groove 211a is identical with the angle θv2 of the front end portion of the portion overlapping the scanning line 222 in the groove 211a. Therefore, the cross-sectional shape of the portion overlapping the data line 221 in the prism element 211 is identical with the cross-sectional shape of the portion overlapping the scanning line 222. Accordingly, it is possible to uniformly condense the light which has passed and spread through the opening portion 207b of the light-shielding section 207. On the contrary, when the width Wv1 of the portion overlapping the data line 221 in the groove 211a is different from the width Wv2 of the portion overlapping the scanning line 222 in the groove 211a or the depth Dv1 of the portion overlapping the data line 221 in the groove 211a is different from the depth Dv2 of the portion overlapping the scanning line 222 in the groove 211a, the cross-sectional shape of the portion of the data line 221 in the prism element 211 is different from the cross-sectional shape of the portion overlapping the scanning line 222 in the prism element 211. Therefore, it is difficult to uniformly condense the light which has passed and spread through the opening portion 207b of the light-shielding section 207.

With such a configuration, since the refractive index of the inside (for example, an air layer or vacuum) of the groove 211a is less than the refractive index of the TFT array substrate 208, it is easy to satisfy the total reflection condition when the light which has passed and spread through the opening portion 207b of the light-shielding section 207 is incident on the prism element 211. Accordingly, it is possible to reliably condense the light which has passed and spread through the opening portion 207b of the light-shielding section 207.

With such a configuration, the surface of the cover portion 212 close to the light-shielding layer 207a is a flat surface. Therefore, there is less a concern that line disconnection occurs when wirings or the like are formed in the upper portion of the cover portion 212.

The projector 100 according to this embodiment includes the above-described liquid crystal device 120R. Accordingly, it is possible to provide the projector capable of displaying a high-quality image.

Second Embodiment

Figure 11:
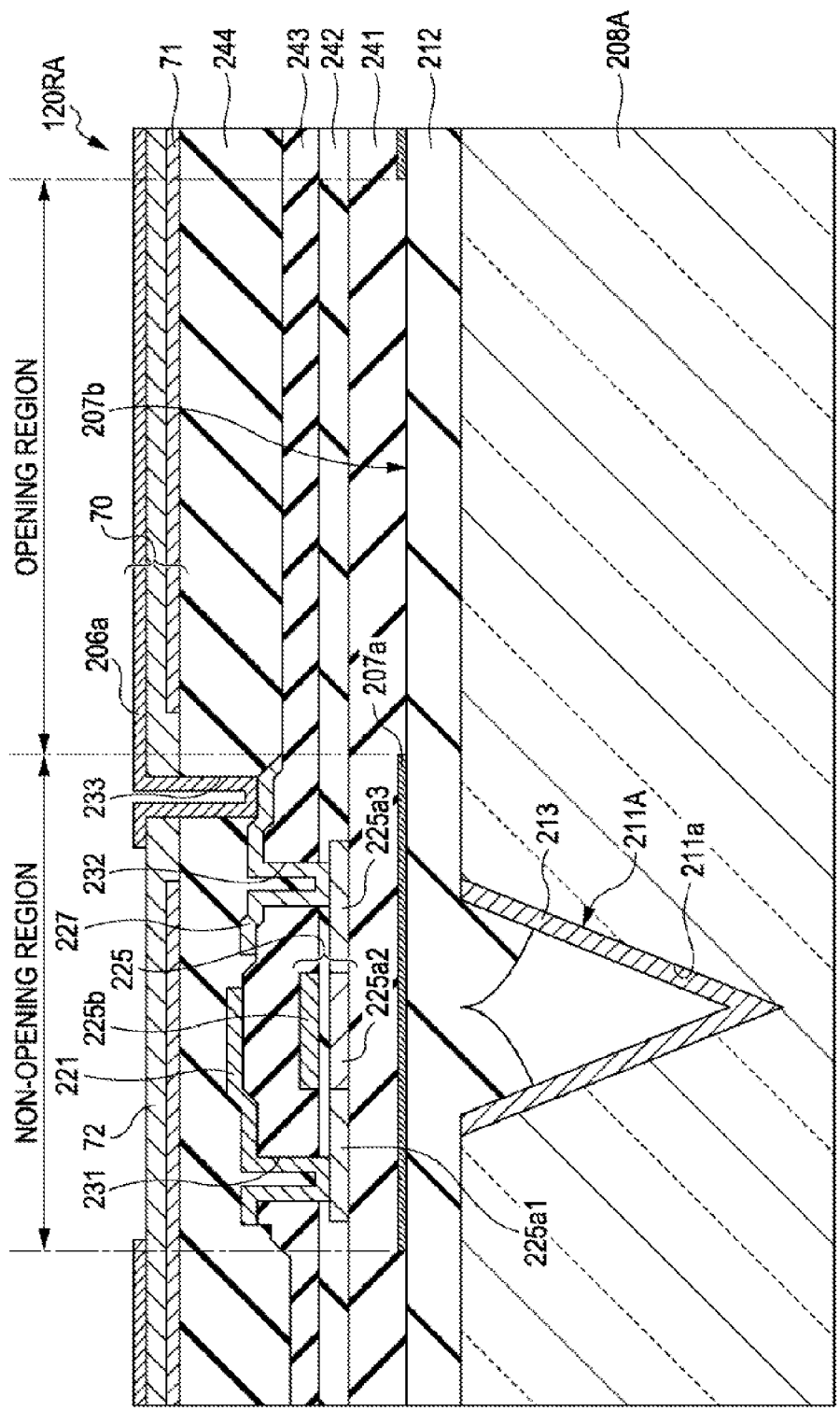
FIG. 11 is a sectional view illustrating a part of a liquid crystal device according to a second embodiment of the invention.

FIG. 11 is a sectional view corresponding to FIG. 6 and illustrating a part of a liquid crystal device 120RA according to a second embodiment of the invention.

As shown in FIG. 11, the liquid crystal device 120RA according to this embodiment is different from the liquid crystal device 120R described above in the first embodiment in that the liquid crystal device 120RA includes a prism element 211A instead of the above-described prism element 211. Since the remaining configuration is the same as the above-described configuration, the same reference numerals are given to the same constituent elements as those of FIG. 6 and the detailed description will not be repeated.

A reflection film 213 is formed inside a groove 211a of the prism element 211A. As the material of the reflection film 213, a metal material, such as rhodium (Rh), having excellent reflectivity at a high melting point (1966° C.) can be used. In this way, the application can be achieved in the process of manufacturing a high-temperature polysilicon TFT. In a case of a process of manufacturing an amorphous silicon TFT, the material of the reflection film is not limited to Rh. Aluminum (Al), platinum (Pt), or the like can be used.

FIGS. 12A to 12D are sectional views illustrating steps of a method of manufacturing the liquid crystal device. A step of forming the prism element 211A in a TFT array substrate 208A in the liquid crystal device 120RA with the above-described configuration and a step of forming the light-shielding layer 207a will be described. Since a step of forming the groove 211a of the prism element 211A is the same as the step described with reference FIGS. 9A to 9C, the detailed description will not be repeated.

Figure 12A:
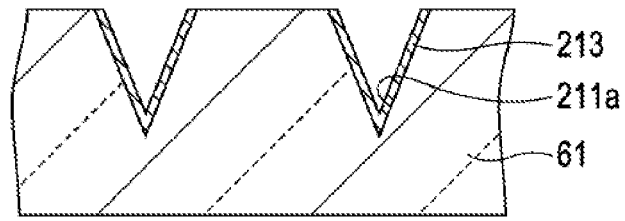
FIGS. 12A to 12D are sectional views illustrating steps of a method of manufacturing the liquid crystal device according to the second embodiment of the invention.

First, as shown in FIG. 12A, the reflection film 213 is formed inside the groove 211a. The reflection film 213 is preferably made of a metal material having a high melting point and excellent reflectivity. In this embodiment, Rh is used. A sputtering method is used as the method of forming the reflection film 213.

Figure 12B:
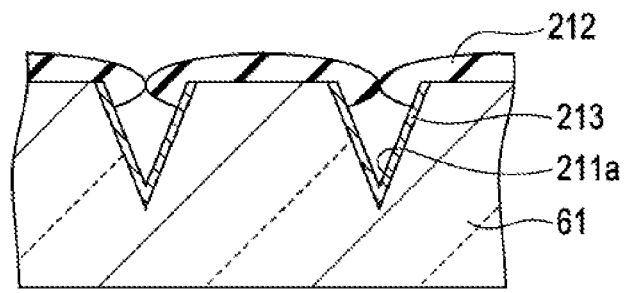

Next, as shown in FIG. 12B, the cover portions 212 are formed so as to occupy the opening portions on the upper side of the groove 211a. In this embodiment, silicon oxide ($SiO_2$), silicon nitride (SiN), or the like used to form an insulation film which can be formed in the same process as the process of manufacturing the TFTs is used. A CVD method or the like is used as a method of forming the cover portions 212.

Figure 12C:
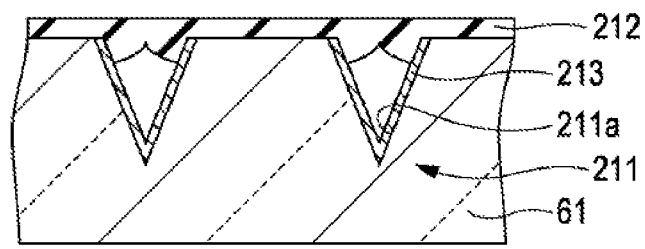

Next, as shown in FIG. 12C, the upper surfaces of the cover portions 212 are flattened by chemical mechanical polishing (CMP). The thickness of the cover portion 212 may be set to the extent that the light-shielding layer 207a can be formed on the groove 211a with the cover portion 212 interposed therebetween and the above-described protection function can be realized.

Figure 12D:
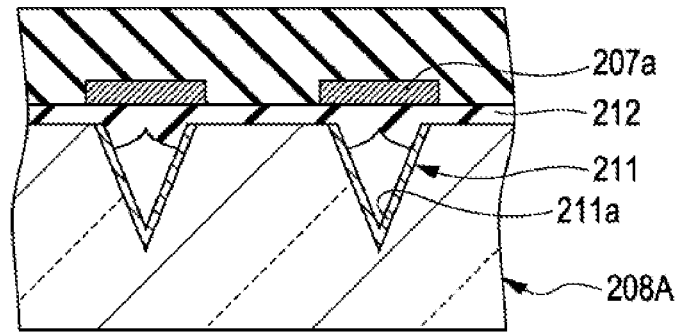

Next, as shown in FIG. 12D, the light-shielding layer 207a is formed on the upper surface of the cover portion 212. The light-shielding layer 207a made of a metal material such as Cr or Al or black resin is formed on the cover portion 212. A known film forming method such as a sputtering method or a CVD method can be used as the method of forming the light-shielding layer 207a.

Thereafter, the TFT array substrate 208A can be manufactured by forming the pixel electrodes, the alignment films, and the like. Then, the liquid crystal device 120RA can be manufactured by bonding the TFT array substrate 208A to the counter substrate 200 separately manufactured and sealing the liquid crystal layer 205 between the TFT array substrate 208A and the counter substrate 200.

In the liquid crystal device 120RA according to this embodiment, the light-incident surface of the prism element 211A functions as a reflection surface. Accordingly, it is possible to reliably condense the light which has passed and spread through the opening portion 207b of the light-shielding section 207.

Third Embodiment

Figure 13:
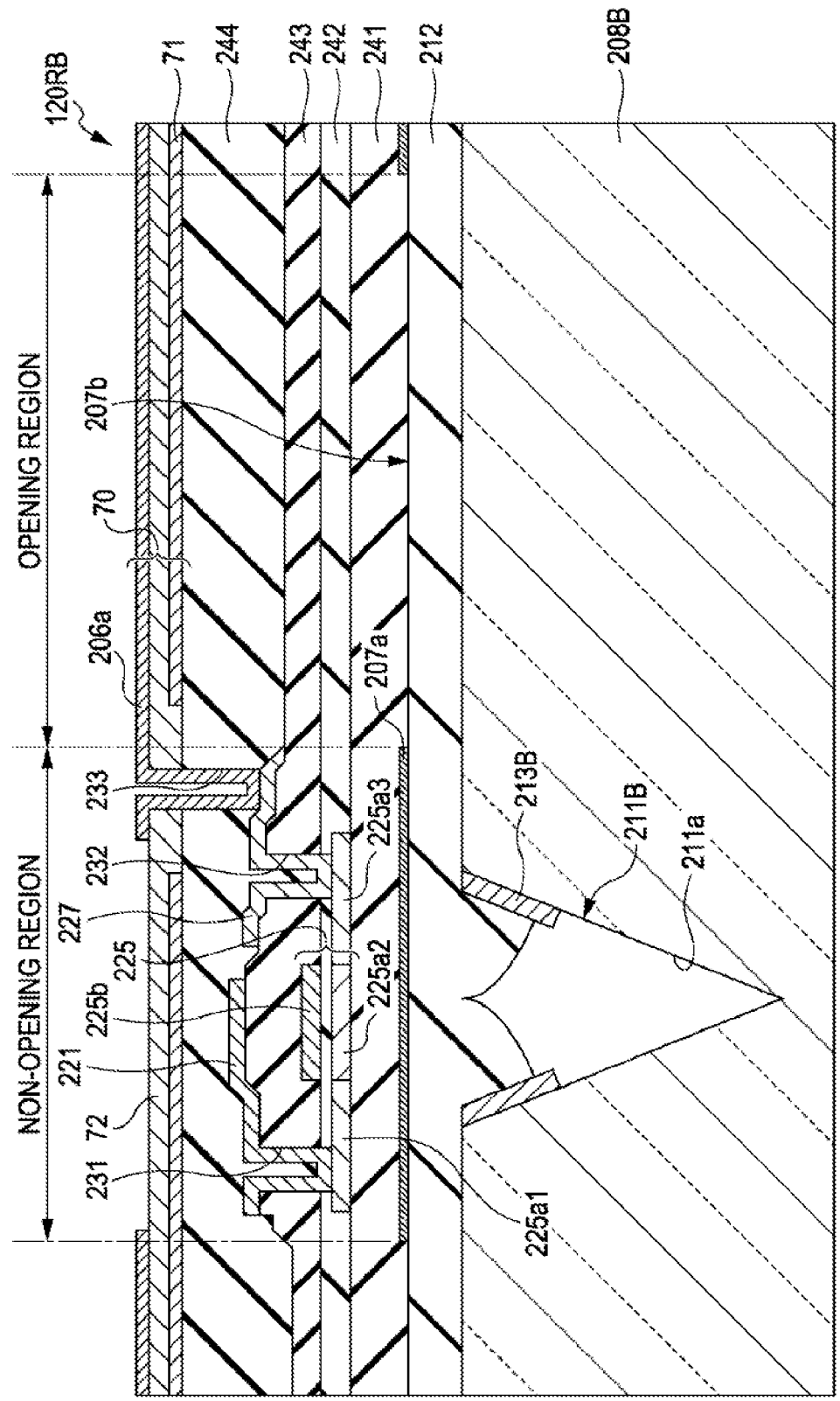
FIG. 13 is a sectional view illustrating the configuration of a part of a liquid crystal device according to a third embodiment of the invention.

FIG. 13 is a sectional view corresponding to FIG. 6 and illustrating the configuration of a part of a liquid crystal device 120RB according to a third embodiment of the invention.

As shown in FIG. 13, the liquid crystal device 120RB according to this embodiment is different from the liquid crystal device 120R described above in the first embodiment in that the liquid crystal device 120RB includes a prism element 211B instead of the above-described prism element 211. Since the remaining configuration is the same as the above-described configuration, the same reference numerals are given to the same constituent elements as those of FIG. 6 and the detailed description will not be repeated.

A part of the cover portion 212 penetrates into a portion (the opening portion on the upper side) of the groove 211a of the prism element 211B close to the liquid crystal layer 205. A reflection film 213B is formed in a portion at least overlapping the portion of the groove 211a into which the part of the cover portion 212 penetrates. As the material of the reflection film 213B, for example, Rh is used.

FIGS. 14A to 14D are sectional views illustrating steps of a method of manufacturing the liquid crystal device. A step of forming the prism element 211B in a TFT array substrate 208B in the liquid crystal device 120RB with the above-described configuration and a step of forming the light-shielding layer 207a will be described. Since a step of forming the groove 211a of the prism element 211B is the same as the step described with reference FIGS. 9A to 9C, the detailed description will not be repeated.

Figure 14A:
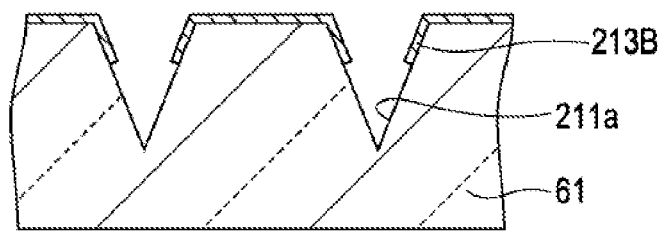
FIGS. 14A to 14D are sectional views illustrating steps of a method of manufacturing the liquid crystal device according to the third embodiment of the invention.

First, as shown in FIG. 14A, the reflection film 213B is formed in the opening portion on the upper side of the groove 211a. Rh is used as the material of the reflection film 213B. A sputtering method is used as the method of forming the reflection film 213B. Since the width Wv of the groove 211a is small (for example, 2 μm), the reflection film 213B is selectively formed in the opening portion on the upper side of the groove 211a.

Figure 14B:
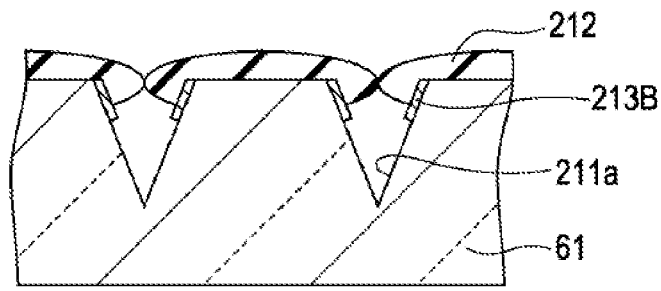

Next, as shown in FIG. 14B, the cover portions 212 are formed so as to occupy the opening portions on the upper side of the groove 211a. In this embodiment, silicon oxide (SiO$_2$), silicon nitride (SiN), or the like used to form an insulation film which can be formed in the same process as the process of manufacturing the TFTs is used. A CVD method or the like is used as a method of forming the cover portions 212. Since the width Wv of the groove 211a is small, the cover portion 212 is formed at a position overlapping the reflection film 213B selectively formed in the opening portion on the upper side of the groove 211a. Further, the formed reflection film 213B is removed by a polishing process or a photo etch process so that the opening portion of the groove 211a remains.

Figure 14C:
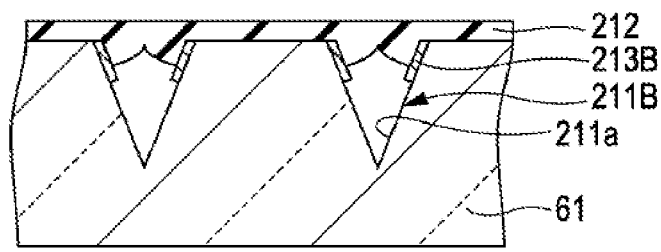

Next, as shown in FIG. 14C, the upper surfaces of the cover portions 212 are flattened by chemical mechanical polishing (CMP). The thickness of the cover portion 212 may be set to the extent that the light-shielding layer 207a can be formed on the groove 211a with the cover portion 212 interposed therebetween and the above-described protection function can be realized.

Figure 14D:
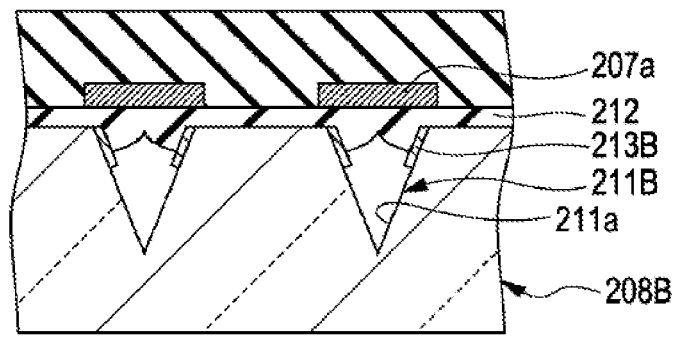

Next, as shown in FIG. 14D, the light-shielding layer 207a is formed on the upper surface of the cover portion 212. The light-shielding layer 207a made of a metal material such as Cr or Al or black resin is formed on the cover portion 212. A known film forming method such as a sputtering method or a CVD method can be used as the method of forming the light-shielding layer 207a.

Thereafter, the TFT array substrate 208B can be manufactured by forming the pixel electrodes, the alignment films, and the like. Then, the liquid crystal device 120RB can be manufactured by bonding the TFT array substrate 208B to the counter substrate 200 separately manufactured and sealing the liquid crystal layer 205 between the TFT array substrate 208B and the counter substrate 200.

In the liquid crystal device 120RB according to this embodiment, even when the light which has passed and spread through the opening portion 207b of the light-shielding section 207 is incident on the portion of the groove 211a of the prism element 211B into which the part of the cover portion 212B penetrates, the light incident on the portion of the groove 211a can be reflected from the reflection film 213B formed in the portion of the groove 211a. Accordingly, it is possible to reliably condense the light which has passed and spread through the opening portion 207b of the light-shielding section 207.

The invention is applicable to a front projection type projector that projects a projected image from an observing side and a rear projection type projector that projects a projected image from a side opposite to an observing side.

The example has hitherto been described in which the light source device according to the invention is applied to a projector in each embodiment, but the invention is not limited thereto. For example, the light source device according to the invention is applicable to other optical apparatuses (for example, an optical disk apparatus, a vehicle head lamp, or a lighting apparatus).

This application claims priority from Japanese Patent Application No. 2011-067782 filed in the Japanese Patent Office on Mar. 25, 2011, the entire disclosure of which is hereby incorporated by reference in its entirely.

What is claimed is:

1. A liquid crystal device comprising:
a first substrate on a light incident side;
a second substrate on a light exit side; and
a liquid crystal layer between the first substrate and the second substrate,
one of the first substrate and the second substrate having a light transmission section at a position overlapping a plurality of pixels in a plan view and a light-shielding section at a position overlapping a space between the plurality of pixels in a plan view,
the first substrate having a condensing lens that condenses incident light into an inside of the light transmission section,
the second substrate having a prism element that condenses light passing and spreading through the light transmission section into a position overlapping the light-shielding section in a plan view, and
the prism element including a groove,
wherein a cover portion occupying a portion of the groove close to the liquid crystal layer is formed between the light-shielding section and the prism element,
wherein an inside of the groove is a void,
wherein a part of the cover portion penetrates into a portion of the groove close to the liquid crystal layer, and
wherein a reflection film is formed in a portion at least overlapping the portion of the groove into which the part of the cover portion penetrates and in the opening portion on the upper side of the groove.

2. The liquid crystal device according to claim 1, wherein a depth of the groove is greater than a width of the groove.

3. The liquid crystal device according to claim 1,
wherein the light-shielding section has a data line and a scanning line intersecting each other,
wherein the groove has a V shape in a cross-sectional view,
wherein a width of a portion overlapping the data line in the groove is identical with a width of a portion overlapping the scanning line in the groove, and
wherein a depth of the portion overlapping the data line in the groove is identical with a depth of the portion overlapping the scanning line in the groove.

4. The liquid crystal device according to claim 1, wherein a surface of the cover portion close to the light-shielding section is a flat surface.

5. A projector comprising:
a light source device;
the liquid crystal device according to claim 1 which modulates light emitted from the light source device in accordance with image information; and
a projection optical system projecting the light modulated by the liquid crystal device as a projected image.

6. A liquid crystal device comprising:
a first substrate on a light incident side;
a second substrate on a light exit side; and
a liquid crystal layer between the first substrate and the second substrate,
one of the first substrate and the second substrate having a light transmission section at a position overlapping a plurality of pixels in a plan view and a light-shielding section at a position overlapping a space between the plurality of pixels in a plan view, the light-shielding section having a data line and a scanning line intersecting each other, the first substrate having a condensing lens that condenses incident light into an inside of the light transmission section, the second substrate having a prism element that condenses light passing and spreading through the light transmission section into a position overlapping the light-shielding section in a plan view, and the prism element including a groove having a V shape in a cross-sectional view, wherein a width of a portion overlapping the data line in the groove is identical with a width of a portion overlapping the scanning line in the groove, wherein a depth of the portion overlapping the data line in the groove is identical with a depth of the portion overlapping the scanning line in the groove, wherein a cover portion occupying a portion of the groove close to the liquid crystal layer is formed between the light-shielding section and the prism element, wherein a part of the cover portion penetrates into a portion of the groove close to the liquid crystal layer, and wherein a reflection film is formed in a portion at least overlapping the portion of the groove into which the part of the cover portion penetrates and in the opening portion on the upper side of the groove.

* * * * *